April 7, 1931.  C. M. HATHAWAY  1,800,018
OSCILLOGRAPH GALVANOMETER
Filed Sept. 6, 1929
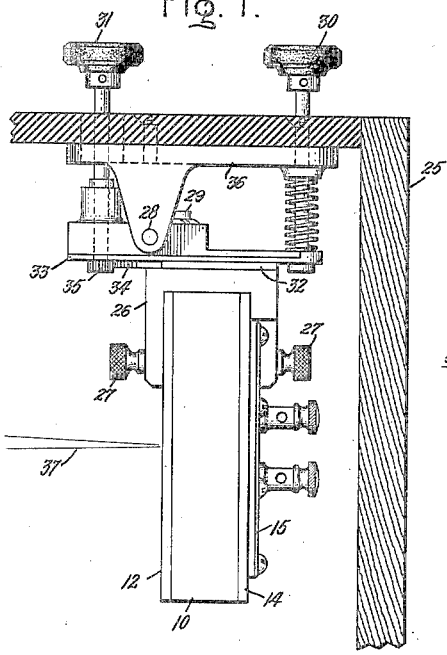
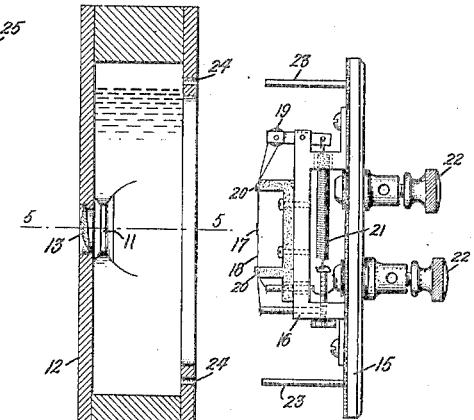
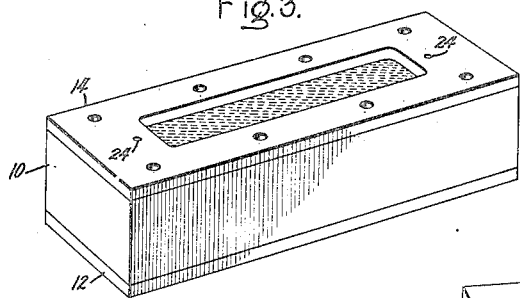
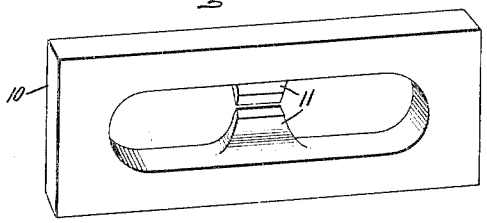
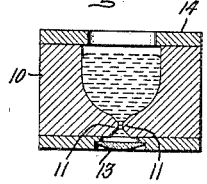
Inventor:
Claude M. Hathaway,
by Charles E. Tullar
His Attorney.

Patented Apr. 7, 1931

1,800,018

UNITED STATES PATENT OFFICE

CLAUDE M. HATHAWAY, OF SCHENECTADY, NEW YORK, ASSIGNOR TO GENERAL ELECTRIC COMPANY, A CORPORATION OF NEW YORK

OSCILLOGRAPH GALVANOMETER

Application filed September 6, 1929. Serial No. 390,833.

My invention relates to galvanometers and in particular to oscillograph galvanometers. Its object is to provide a portable galvanometer of the class described, of simple, low cost, rugged construction with its delicate parts amply protected and readily accessible.

In carrying my invention into effect I utilize the stationary magnet structure of the galvanometer as the main portion of the cell box employed to enclose the delicate galvanometer mirror and its suspension in a damping liquid. By such an arrangement I am enabled to materially reduce the size and simplify the construction of this portion of the oscillograph. The improved cell box is a rugged portable element which lends itself to a simple form of mounting as will be explained hereinafter.

The features of my invention which are believed to be novel and patentable will be pointed out in the claims appended hereto. For a better understanding of my invention reference is made in the following description to the accompanying drawing in which Fig. 1 illustrates my improved cell box as mounted in the oscillograph casing; Fig. 2 shows a cross-section through the cell box with the cover supporting the mirror suspension or vibrator element removed; Fig. 3 shows a perspective view of the cell box in the position it should be placed to remove the cover so as not to spill the damping liquid; Fig. 4 shows a perspective view of the magnet portion of the cell box alone; and Fig. 5 shows a cross-section of the cell box taken on line 5—5 of Fig. 2.

The main portion of the cell box comprises a permanent magnet 10 preferably provided with a double magnetic circuit and a single pair of internal pole tips 11. This portion of the cell box as shown is of a hollow oblong shape resembling in general a hollow rectangle with the pole pieces 11 extending toward each other from the inside walls near one side and midway between the ends along the shorter axis as best shown in Fig. 4. A circular shaped structure might also be used. This magnet is made from some good permanent magnet steel, such for example as cobalt steel. However the pole tips may be made of soft iron if desired. The double magnetic circuit is so magnetized as to produce fluxes in the same direction between the single pair of pole tips and in this way I am able to obtain a very intense magnetic field in the air gap between the pole tips 11 by a comparatively small magnetic structure. The magnetic structure in addition to being advantageously arranged for producing an intense magnetic field is also shaped to serve as the main body of the cell box since it completely surrounds the pole pieces in one plane and it only becomes necessary to provide two side covers fitted to the flat side walls of the magnet to obtain a closed cell box. To this end I provide a front cover 12 provided with a lens window at 13 located directly in front of the air gap between the pole tips 11. The window is permanently secured in place in the front cover 12 and the front cover is secured to the magnet 10 in any desired manner so as to provide an oil-tight closure.

The rear closure is preferably made in two parts; a hollow rectangular plate 14 and a cover plate 15 which supports the galvanometer mirror suspension on its inner surface. Plate 14 may be permanently secured to the magnet in any suitable way but the cover plate 15 is removably secured in place as by screws in order that it may be removed for filling the cellbox with the transparent damping oil and for inspection and repair of the galvanometer mirror and its suspension. When these covers are in place as shown in Fig. 1 we have an oil-tight boxlike cuboid shaped structure with all of the delicate parts protected. The cover plates are made of non-magnetic material such as brass.

The vibratory mirror galvanometer suspension is supported on a frame 16 secured to the inside of the removable cover plate 15 and when this plate is removed all the parts of the suspension system are nicely exposed and accessible for inspection, repair and adjustment. The galvanometer mirror and its suspension system are generally similar to those used in previous oscillographs. The mirror 17 is supported on conductor 18 which is looped about an insulating spool 19 and held under tension across bridges 20 by an adjustable spring 21. The conductor is connected between terminals 22 on the exterior of the plate 15. It will be understood that when the parallel portions of the conductor 18 and the mirror 17 are placed in the intense magnetic field between the pole pieces 11 and a current is passed through the conductor the mirror is turned by an amount and in a direction dependent upon the strength and direction of the current and that a record may be made of the resulting deflections or vibrations of the mirror by a light ray recording system, not shown, the light rays entering and leaving the cell box through the window lens 13 as indicated at 37 in Fig. 1.

In order to exactly position the mirror 17 in the air gap in front of the window 13 I provide guiding and positioning means such as dowel pins 23 on the plate 15 fitting dowel pin holes 24 in the plate 14. When the rear cover plate 15 is put on to insert the vibrator element and close the cell box, dowel pins 23 enter the holes 24 and correctly position the parts in their operative relation. These dowel pins also serve to prevent any sidewise movement of plate 15 while the vibrator element is being inserted or removed and thus the delicate parts of the mirror suspension are protected from any damage that might otherwise be caused by a careless removal if such parts were permitted to come in contact with the pole pieces or the edge of the opening in plate 14. In order not to spill the damping liquid contained within the cell box the latter should be placed with the plate 15 uppermost when the box is opened.

Fig. 1 shows the simple manner in which the cell box may be supported in the oscillograph casing represented at 25. A clamping support 26 is provided with spaced jaws and clamping thumb screws 27. The cell box is slid into place and the thumb screws tightened slightly. The support 26 is arranged to be adjusted about horizontal and vertical axes 28 and 29 by means of adjusting shafts 30 and 31 extending through the top cover of the casing for the purpose of aligning the oscillograph mirror with respect to the light ray recording system, not shown.

The support 26 is provided with a horizontal plate 32 at its top which is suitably held in sliding contact with another plate 33 by a vertical pivot pin 29. The plate 32 is provided with a gear sector 34 meshing with a pinion 35 on the adjusting shaft 31. Rotation of 31 thus rotates the cell box about the vertical axis 29, which axis passes through the mirror 17 when the cell box is in position. The plate 33 is horizontally pivoted at 28 in trunnions on part 36 secured to the inner top wall of the casing and the cell box is tilted about this axis by rotation of the shaft 30 which is threaded through the part 36.

It will thus be seen that the arrangement provides for all the necessary adjustments in a simple manner. The cell box is quickly and easily replaceable by another cell box if for any reason such change is desired. Heretofore it has been the practice to have available a number of spare vibrator elements to avoid serious delay in making repairs to the oscillograph apparatus during a series of tests. With my invention there is little danger of breakage but in case spare parts are desired it will be more expedient to provide spare cell boxes complete with vibrator elements since my improved cell box is relatively small and inexpensive and sufficiently rugged in construction that it may be handled by inexperienced operators without danger of breakage. Owing to the material reduction in size of the cell box obtained by utilizing the permanent magnet as the main portion thereof a considerable reduction in size of the complete oscillograph is now made possible. Without intending to limit my invention to any particular dimensions of the cell box but rather to give a general idea of practicable dimensions it may be stated that I have built oscillograph cell boxes in accordance with this invention having a length of 3¼" and otherwise proportioned substantially as illustrated in the accompanying drawing.

In accordance with the provisions of the patent statutes I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States is:—

1. A combination galvanometer and oiltight cell box therefor having a stationary permanent magnet cooperating with a movable vibrator element contained within said box, the greater portion of said box being formed by the permanent magnet.

2. A cuboidal shaped cell box, a permanent magnet galvanometer in said box, the permanent magnet of which forms four walls of said box.

3. A cell box having side walls and front and rear cover plates, a permanent magnet galvanometer contained therein, the permanent magnet of which forms the side walls of said box.

4. A galvanometer comprising a permanent magnet having a double magnetic circuit and a pair of inwardly projecting pole pieces, the magnetic circuit completely surrounding the pole pieces in one plane, cover plates for the other sides of said magnet forming with said magnet an oil-tight cell box, a window in one of said cover plates opposite the pole pieces, and a galvanometer vibrator element supported on the inner wall of the other cover plate in operative relation with said pole pieces.

5. A galvanometer comprising a permanent magnet having inwardly projecting pole pieces and a double magnetic circuit completely surrounding the pole pieces in one plane, a cover plate containing a window opposite the pole pieces closing one side of said magnet, a removable cover plate closing the other side of said magnet, said parts forming an oil-tight cell box, and a galvanometer vibrator element cooperating with said pole pieces supported on the inner wall of the removable cover plate.

6. A combination cell box and permanent magnet galvanometer comprising a hollow steel structure with openings on opposite sides, non-magnetic plates closing the opposite sides of the hollow steel structure to form an oil-tight enclosure, said steel structure comprising a permanent magnet having internal spaced pole pieces, a galvanometer vibrator element supported on the inner wall of one of said plates in operative relation between said pole pieces, and a window in the other plate opposite to said vibrator element.

7. A galvanometer comprising a permanent magnet having a double magnetic circuit conforming in general to the shape of a hollow cuboid with inwardly projecting pole pieces extending toward each other from the inner walls of said structure, a plate provided with a window opposite to the pole pieces closing one of the open sides of said hollow cuboidal structure, a removable plate closing the other open side of said structure so as to form an oil-tight cell box, and a galvanometer vibrator element supported on the inner wall of said removable cover plate in operative relation with said pole pieces.

8. A permanent magnet galvanometer having a permanent magnet of a hollow oblong shape with inwardly projecting pole pieces on its shorter axis, near one side, plates covering the open sides of said structure and forming therewith an oil-tight cell box, a window opposite the pole pieces in the cover plate nearest thereto, and a galvanometer vibrator supported on the inner wall of the other cover plate in operative relation between said pole pieces.

9. A cell box comprising a hollow oblong shaped permanent magnet with inwardly projecting pole pieces along its shorter axis, cover plates closing the open sides of said magnet structure, a window in one cover plate opposite the pole pieces, a galvanometer vibrator supported on the inner wall of the other cover plate in operative relation between said pole pieces, said last mentioned plate being removable, and means for guiding said last mentioned plate when it is removed or replaced to prevent the vibrator from coming in contact with the pole pieces.

10. In an oscillograph, a casing having a top wall, a galvanometer support suspended from the inner side of said top wall, said support being adjustable about horizontal and vertical axes, means extending through the top wall of said casing for making said adjustments from the outside, and a completely enclosed galvanometer mounted on said support and removable as a unit therefrom, said galvanometer consisting of a closed box composed in part of a permanent magnet and completely enclosing the galvanometer vibrator element.

In witness whereof, I have hereunto set my hand this 5th day of September, 1929.
CLAUDE M. HATHAWAY.